United States Patent

Kohda

[11] Patent Number: 5,591,982
[45] Date of Patent: Jan. 7, 1997

[54] RADIATION IMAGE STORAGE PANEL AND RADIATION IMAGE RECORDING AND REPRODUCING METHOD

[75] Inventor: Katsuhiro Kohda, Kanagawa, Japan

[73] Assignee: Fuji Photo Film Co., Ltd., Kanagawa, Japan

[21] Appl. No.: 412,565

[22] Filed: Mar. 29, 1995

[30] Foreign Application Priority Data

Apr. 15, 1994 [JP] Japan .................................... 6-101997

[51] Int. Cl.$^6$ ................................................. G03B 42/00
[52] U.S. Cl. .................................. 250/484.4; 250/483.1; 250/581; 250/583; 250/584; 250/586
[58] Field of Search ................................. 250/484.4, 583, 250/581, 483.1, 484.2, 372, 584, 586

[56] References Cited

U.S. PATENT DOCUMENTS

| | | | |
|---|---|---|---|
| 4,346,295 | 8/1982 | Tanaka et al. | 250/586 |
| 4,394,581 | 7/1983 | Takahashi et al. | 250/484.1 |
| 4,574,102 | 3/1986 | Arakawa et al. | 250/483.1 |
| 4,737,641 | 4/1988 | Lange et al. | 250/586 |
| 4,886,967 | 12/1989 | Itakura | 250/589 |
| 4,926,047 | 5/1990 | Takahashi et al. | 250/484.4 |
| 4,950,559 | 8/1990 | Arakawa et al. | 250/484.4 |

Primary Examiner—Constantine Hannaher
Assistant Examiner—Virgil Orlando Tyler
Attorney, Agent, or Firm—Sixbey, Friedman, Leedom & Ferguson, PC; Gerald J. Ferguson, Jr.; Jeffrey L. Costelllia

[57] ABSTRACT

A radiation image storage panel preferably employable for a double-side reading system has a colored stimulate phosphor layer in which a ratio of weight of phosphor particles to binder is so adjusted as to vary in the direction of depth of the phosphor layer under the condition that a ratio of weight of phosphor particles to binder in a portion up to 1/5 of the depth of the layer from one surface of the layer is lower than the ratio of weight of phosphor particles to binder in the phosphor layer, and the portion is colored more deeply than other portion of the phosphor layer.

3 Claims, 2 Drawing Sheets

RADIATION IMAGE STORAGE PANEL AND RADIATION IMAGE RECORDING AND REPRODUCING METHOD

FIELD OF THE INVENTION

The present invention relates to a radiation image storage panel utilizing stimulable phosphor and a radiation image recording and reproducing method employing the radiation image storage panel. Particularly, the invention is directed to a radiation image recording and reproducing method in which the emission produced by the stimulable phosphor of the radiation image storage panel is detected on both sides of the storage panel.

BACKGROUND OF THE INVENTION

A radiation image recording and reproducing method utilizing a stimulable phosphor is described, for example, in U.S. Pat. No. 4,239,968. In the method, a radiation image storage panel comprising a stimulable phosphor (i.e., stimulable phosphor sheet) is used, and the method comprises the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release radiation energy stored in the phosphor in the form of light emission (stimulated emission); photoelectrically detecting the emitted light to obtain electric signals; and reproducing the radiation image of the object as a visible image from the electric signals. Thereafter, the radiation energy remaining in the radiation image storage panel may be removed from the panel, and the panel is stored for the next radiographic process.

In the radiation image recording and reproducing method, a radiation image can be obtained with a sufficient amount of information by applying a radiation to an object at a small dose. Therefore, this method is of great value especially when the method is used for medical diagnosis.

The radiation image storage panel employed in the above-described method comprises a stimulable phosphor layer which may be provided on an appropriate support. Further, a transparent film may be provided on its free surface (surface not facing the support) of the phosphor layer to keep the phosphor layer from chemical deterioration or physical shock.

The stimulable phosphor layer comprises a binder and stimulable phosphor particles dispersed in the binder. The stimulable phosphor emits light (i.e., gives stimulated emission) when excited with stimulating rays after having been exposed to a radiation such as X-rays.

The radiation image recording and reproducing method is generally performed in a united radiation image recording and reading apparatus which comprises recording means (for applying a radiation having an image information to the radiation image storage panel to record the radiation image on the storage panel); reading means (for irradiating the stimulating rays to the storage panel having the radiation image to produce stimulated emission from the storage panel and photoelectrically reading the stimulated emission); erasing means (for applying erasing light to the storage panel after the reading step is complete to remove a radiation image remaining in the storage panel); and transfer system (which is arranged between these means, for transferring the storage panel from one means to another means in predetermined order). Alternatively, the radiation image recording and reading apparatus may comprise two separated apparatuses, that is, a radiation image recording apparatus and a radiation image reading apparatus equipped with erasing means.

In any of the radiation image recording and reproducing systems, the radiation image storage panel is repeatedly employed after the remaining radiation image is erased. Particularly, in the former system using the united apparatuses, the radiation image storage panel can be employed repeatedly with successively transferring from one means to another means.

In the radiation image recording and reproducing method, the radiation image recorded in the storage panel is generally read by applying the stimulating rays to one side of the storage panel and collecting a light emitted by the phosphor particles by means of a light-collecting means from the same side (hereinafter referred to as "single-side reading system"). There is a case, however, that the light emitted by the phosphor particles should be collected on both sides of the storage panel. This is because the emitted light is desirably collected as much as possible. There also is a case that the radiation image recorded in the phosphor layer varies along the depth direction of the layer and such variation of the radiation image should be detected. An example of the system for reading radiation image from both sides (hereinafter referred to as "double-side reading system") is illustrated in FIG. 1 of the attached drawings.

In FIG. 1, the radiation image storage panel 11 is transferred (or moved) by a combination of two sets of nip rolls 12a, 12b. The stimulating rays such as laser beam 13 is applied to the storage panel 11 on one side, and the light emitted by the phosphor advances upward and downward (in other words, toward both the upper and lower surfaces). The downward light 14a is collected by a light collector 15a (arranged on the lower side), converted into an electric signal in a photoelectric conversion device (e.g., photomultiplier) 16a, multiplied in a multiplier 17a, and then sent to a signal processor 18. On the other hand, the upward light 14b is directly, or after reflection on a mirror 19, collected by a light collector 15b (arranged on the upper side), converted into an electric signal in a photoelectric conversion device (e.g., photomultiplier) 16b, multiplied in a multiplier 17b, and then sent to the signal processor 18. In the signal processor 18, the electric signals sent from the multipliers 17a, 17b are processed in a predetermined manner such as addition processing or reduction processing depending on the characteristic of the desired radiation image.

In the radiation image recording and reproducing method using the radiation image storage panel, the reproduced radiation image should have high sharpness and good graininess as is in the conventional radiation image reproducing method using a silver halide radiographic film. In order to improve the sharpness and graininess of a radiation image reproduced in the conventional radiation image recording and reproducing method in which the recorded radiation image is read from one side of the radiation image storage panel, i.e., single-side reading system, it has been proposed to color the stimulable phosphor layer with a colorant (i.e., coloring material) capable of absorbing the stimulating rays or to vary the weight ratio of the phosphor particles to the binder in the phosphor layer along the depth direction so that the ratio can become higher on one side. Some of such proposals have been practically adopted.

For the radiation image recording and reproducing method in which the recorded radiation image is read by both sides, i.e., double-side reading system, however, there have been given no proposals to improve the graininess and sharpness of the radiation image reproduced in the method. The improvement of the graininess and sharpness of the radiation image reproduced in the double-side reading system should be achieved by modification of the radiation image storage panel in a way differing from that for the single-side reading system.

SUMMARY OF THE INVENTION

The present invention has an object to provide a radiation image storage panel which is favorably employable in a radiation image recording and reproducing method utilizing the double-side reading system.

The invention further has an object to provide a radiation image recording and reproducing method utilizing the double-side reading system and using an appropriately employable radiation image storage panel.

The present invention resides in a radiation image storage panel having a stimulable phosphor layer which comprises a binder and stimulable phosphor particles dispersed therein and is so colored as to absorb a portion of stimulating rays, wherein the coloring and a ratio of phosphor particles to binder vary in the phosphor layer in the depth direction under the conditions that one area from one surface up to ⅕ of the depth of the phosphor layer has a weight ratio of phosphor particles to binder which is lower than a mean weight ratio of phosphor particles to binder of the phosphor layer, and depth of color of said area is more than a mean depth of color of the phosphor layer.

The radiation image storage panel of the invention preferably has one or more of the following additional features:

(1) An area from another surface up to ⅕ of the depth of the phosphor layer has a weight ratio of phosphor particles to binder which is lower than a mean weight ratio of phosphor particles to binder of the phosphor layer;

(2) An area from another surface up to ⅕ of the depth of the phosphor layer is not colored; and (3) The ratio of phosphor particles to binder in the stimulable phosphor layer has the maximum value in its middle area of the phosphor layer.

According to the invention, the sharpness and graininess of the radiation image reproduced in the double-side reading system can be improved by decreasing the phosphor/ binder ratio in the area near to the surface to receive the stimulating rays, as compared with the phosphor/binder ratio in the inner area of the phosphor layer and coloring the surface area more deeply than other area so that the surface area can absorb a portion of the stimulating rays to reduce spread of the stimulating rays within the phosphor layer.

Accordingly, the invention further resides in a radiation image recording and reproducing method comprising the steps of:

causing the stimulable phosphor of the above-mentioned radiation image storage panel of the invention to absorb radiation energy having passed through an object or having radiated from an object;

sequentially exciting the stimulable phosphor with an electromagnetic wave while the storage panel is moved in one direction to release the radiation energy stored in the phosphor as light emission;

photoelectrically detecting the emitted light from both sides of the storage panel to obtain electric signals; and, reproducing the radiation image of the object as a visible image from a combination of the electric signals detected on the both sides of the storage panel.

DETAILED DESCRIPTION OF THE INVENTION

Figure 1:
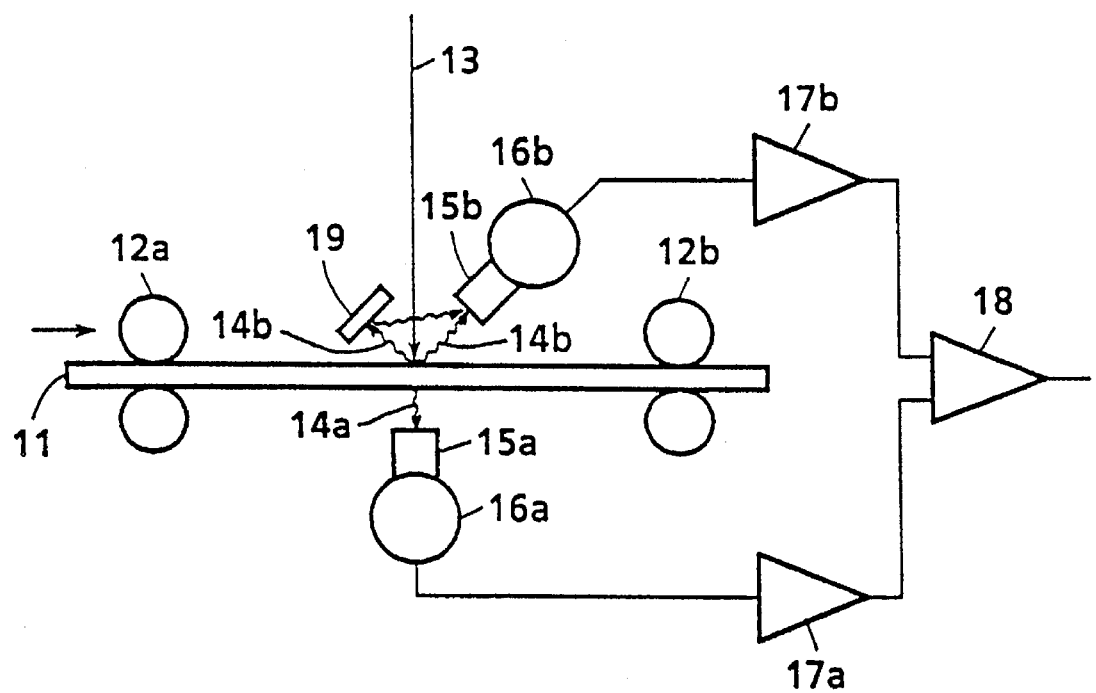
FIG. 1 shows a schematic view of a radiation image reading system reading from both sides (double-side reading system).

The radiation image storage panel of the invention can be prepared by the following process.

The stimulable phosphor gives stimulated emission when excited with stimulating rays after exposure to a radiation. From the viewpoint of practical use, the stimulable phosphor is desired to give a stimulated emission in the wavelength region of 300–500 nm when excited with stimulating rays in the wavelength region of 400–900 nm.

Examples of the stimulable phosphors employable in the radiation image storage panel of the invention include:

SrS:Ce, Sm, SrS:Eu, Sm, ThO$_2$:Er, and La$_2$O$_2$S:Eu, Sm;

ZnS:Cu, Pb, BaO.xAl$_2$O$_3$:Eu ($0.8 \leq x \leq 10$), and M'''O.xSiO$_2$:A (M'' is Mg, Ca, Sr, Zn, Cd or Ba, A is Ce, Tb, Eu, Tm, Pb, Tl, Bi or Mn, and $0.5 \leq x \leq 2.5$;

$(Ba_{1-x-y},Mg_x,Ca_y)FX:aEu^{2+}$, in which X is Cl or Br, $0<x+y\leq0.6$ and $xy\neq0$, and $10^{-6}\leq a\leq 5\times 10^{-2}$;

LnOX:xA, in which Ln is La, Y, Gd or Lu, X is Cl or Br, A is Ce or Tb, and $0<x<0.1$;

$(Ba_{1-x},M''_x)FX:yA$, in which M'' is Mg, Ca Sr Zn or Cd, X is Cl, Br or I, A is Eu, Tb, Ce, Tm, Dy, Pr, Ho, Nd, Yb or Er, $0\leq x\leq 0.6$, and $0\leq y\leq 0.2$;

M''FX.xA:yLn, in which M'' is Ba, Ca, Sr, Mg, Zn or Cd; A is BeO, MgO, CaO, SrO, BaO, ZnO, Al$_2$O$_3$, Y$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$ or ThO$_2$; Ln is Eu, Tb, Ce, Tm, Dy, Pr, Ho, Nd, Yb, Er, Sm or Gd; X is Cl, Br or I; $5\times10^{-5}\leq x\leq 0.5$; and $0<y\leq 0.2$;

$(Ba_{1-x},M''_x)F_2.aBaX_2:yEu, zA$, in which M'' Be, Mg, Ca, Sr, Zn or Cd; X is Cl, Br or I; A is Zr or Sc; $0.5\leq a\leq 1.25$; $0\leq x\leq 1$; $10^{-6}\leq y\leq 2\times 10^{-1}$; and $0<z\leq 10^{-2}$;

$(Ba_{1-x},M''_x)F_2.aBaX_2:yEu, zB$, in which M'' is Be, Mg, Ca, Sr, Zn or Cd; X is Cl, Br or I; $0.5\leq a\leq 1.25$; $0\leq x\leq 1$; $10^{-6}\leq y\leq 2\times 10^{-1}$; and $0<z\leq 2\times 10^{-1}$;

$(Ba_{1-x},M''_x)F_2.aBaX_2:yEu, zA$, in which M'' is Be, Mg, Ca, Sr, Zn or Cd; X is Cl, Br or I; A is As or Si; $0.5\leq a\leq 1.2$; $0\leq x\leq 1$; $10^{-6}\leq y\leq 2\times 10^{-1}$; and $0<z\leq 5\times 10^{-1}$;

M'''OX:xCe, in which M''' is Pr, Nd, Pm, Sm, Eu, Tb, Dy, Ho, Er, Tm, Yb, or Bi; X is Cl or Br; and $0<x<0.1$;

$Ba_{1-x}M_{x/2}L_{x/2}FX:yEu^{2+}$, in which M is Li, Na, K, Rb or Cs; L is Sc, Y, La, Ce, Pr, Nd, Pm, Sm, Gd, Tb, Dy, Ho, Er, Tm, Yb, Lu, Al, Ga, In or Tl; X is Cl, Br or I; $10^{-2}\leq x\leq 0.5$; and $0<y\leq 0.1$;

BaFX.xA:yEu$^{2+}$, in which X is Cl, Br or I; A is a fired product of a tetrafluoroboric acid compound; $10^{-6}\leq x\leq 0.1$; and $0<y\leq 0.1$;

BaFX.xA:yEu$^{2+}$, in which X is Cl, Br or I; A is monovalent or divalent metal salt of hexafluoro silicic acid, hexafluoro titanic acid or hexafluoro zirconic acid; $10^{-6} \leq x \leq 0.1$; and $0 < y < 0.1$;

BaFX.xNaX':aEu$^{2+}$, in which each of X and X' is Cl, Br or I; $0 < x \leq 2$; and $0 < a \leq 0.2$;

M$''$FX.xNaX':yEu$^{2+}$:zA, in which M$''$ is Ba, Sr or Ca; each of X and X' is Cl, Br or I; A is V, Cr, Fin, Fe, Co or Ni; $0 < x \leq 2$; $0 < y \leq 0.2$; and $0 < z \leq 10^{-2}$;

M$''$FX.aM$'$X'.bM$'''$X"$_2$.cM$'''$X"'$_3$.xA:yEu$^{2+}$, in which M$''$ is Ba, Sr or Ca; M$'$ is Li, Na, K, Rb or Cs; M$''$ Be or Mg; M$'''$ is Al, Ga, In or Tl; A is Cl, Br or I; each of X', X" and X"' is F, Cl, Br or I; $0 \leq a \leq 2$; $0 \leq b \leq 10^{-2}$; $0 \leq c \leq 10^{-2}$ and $a+b+c \geq 10^{-6}$; $0 < x \leq 0.5$; and $0 < y \leq 0.2$;

M$''$X$_2$.aM$''$X'$_2$:xEu$^{2+}$, in which M$''$ is Ba, Sr or Ca; each of X and X' is Cl, Br or I, and X≠X'; $0.1 \leq a \leq 10.0$; and $0 < x \leq 0.2$;

M$''$FX.aM$'$X':xEu$^{2+}$, in which M$''$ is Ba, Sr or Ca; M$'$ is Rb or Cs; X is Cl, Br or I; X' is F, Cl, Br or I; $0 < a \leq 4.0$; and $0 < x \leq 0.2$;

M$'$X:xBi, in which M$'$ is Rb or Cs; X is Cl, Br or I; and $0 < x \leq 0.2$; and BaFX.aNaX'.dCsX"eCaX"'$_2$.fSrX""$_2$.gCaO.hSrO:bCe$^{3+}$ in which X is Cl, Br or I; X' is Br or I; each of X", X"', and X"" is F, Cl, Br or I; $10^{-4} \leq a+d+e+f+g+h \leq 10^{-1}$; and $10^{-5} \leq b \leq 10^{-2}$; particularly, BaFX.aNaX':bCe$^{3+}$ in which X is Cl, Br or I; X' is Br or I; $0 < a \leq 10^{-1}$; and $10^{-5} \leq b \leq 10^{-2}$.

As the stimulable phosphors, the divalent europium activated alkaline earth metal halide phosphor and the rare earth element activated rare earth oxyhalide phosphor are particularly preferred, because they show a stimulated emission of high luminance.

Examples of the binders employable for the formation of the stimulable phosphor layer include: natural polymers such as proteins (e.g., gelatin) and polysaccharides (e.g., dextran); and synthetic polymers such as polyvinyl butyral, polyvinyl acetate, ethyl cellulose, vinylidene chloride-vinyl chloride copolymer, vinyl chloride-vinyl acetate copolymer, cellulose acetate butyrate, polyvinyl alcohol, linear polyester, polystyrene and epoxy resin. The above-listed binder resins vary their flexibility depending upon their molecular structures and molecular weights and others. Relatively rigid reins are preferred. Most preferred resins are polystyrene, epoxy resins and mixtures of polystyrene and epoxy resins. The binder resins can be cross-linked by the use of a crosslinking agent.

The coloring material employed in the radiation image storage panel is so selected as to show a mean reflectance in the region of the stimulation wavelength of the stimulable phosphor is lower than the mean reflectance in the region of the emission wavelength of the phosphor. Accordingly, the preferred coloring material (i.e., colorant) depends on the stimulable phosphor employed in the radiation image storage panel. Generally, the stimulable phosphor gives stimulated emission in the wavelength of 300 to 500 nm when excited with stimulating rays in the wavelength region of 400 to 900 nm. Therefore, a coloring material preferably is an organic or inorganic colorant which has a body color ranging from blue to green.

Examples of the organic colorants having a body color ranging from blue to green include Zapon Fast Blue 3G (available from Hoechst AG), Estrol Brill Blue N-3RL (available from Sumitomo Chemical Co., Ltd.), Sumiacryl Blue F-GSL (available from Sumitomo Chemical Co., Ltd.), D & C Blue No. 1 (available from National Aniline AG), Sprit Blue (available from Hodogaya Chemical Co., Ltd.), Oil Blue No. 603 (available from Orient Co., Ltd.), Kiton Blue A (available from Ciba-Geigy), Aizen Cathilon Blue GLH (available from Hodogaya Chemical Co., Ltd.), Lake Blue A, F, H (available from Kyowa Sangyo Co., Ltd.), Rodarin Blue 6GX (available from Hodogaya Chemical Co., Ltd.), Primo-cyanine 6GX (available from Inahata Sangyo Co., Ltd.), Brillacid Green 6BH (available from Hodogaya Chemical Co., Ltd.), Cyanine Blue BNRS (available from Toyo Ink Mfg. Co., Ltd.), and Lionol Blue SL (available from Toyo Ink Mfg. Co., Ltd.). Examples of the inorganic colorants having a body color ranging from blue to green include ultramarine (i.e., ultramarine blue), cobalt blue, cerulean blue, chromium oxide, and TiO$_2$—ZnO—CoO—NiO.

The stimulable phosphor layer can be prepared by the following process.

The stimulable phosphor particles, coloring material and binder are placed in an appropriate solvent, and they are mixed to give a coating solution (in the form of a dispersion) comprising the phosphor particles and coloring material dispersed in a binder solution.

Examples of the solvents employable for preparing the coating solution include lower aliphatic alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower aliphatic alcohols with lower aliphatic acids such as methyl acetate, ethyl acetate and butyl acetate; ethers such as dioxane, ethylene glycol monoethyl ether and ethylene glycol monomethyl ether; and mixtures of the above-mentioned compounds.

The ratio between the binder and the phosphor in the coating solution can be determined according to the characteristics of the desired radiation image storage panel and the nature of the employed phosphor. Generally, the ratio is in the range of from 1:1 to 1:100 (binder:phosphor, by weight), preferably in the range of from 1:8 to 1:40, and most preferably in the range of from 1:8 to 1:30.

The coating solution can contain various additives such as a dispersing agent to improve dispersibility of the phosphor particles therein and a plasticizer to increase the bonding between the binder and the phosphor particles in the resulting phosphor layer.

The coating solution containing the phosphor particles, coloring material and binder is then coated uniformly on a temporary support having a plane surface such as a plastic sheet, glass plate, or metal plate. The coating can be conducted, for example, using a doctor blade, a roll coater or a knife coater. The coated solution layer is heated slowly to dryness so as to complete the formation of the desired stimulable phosphor layer.

The thickness of the phosphor layer generally is in the range of 20 μm and 1 mm, depending upon the characteristics of the desired radiation image storage panel, the nature of the employed phosphor, the ratio of the binder to the phosphor, etc. Preferred thickness of the phosphor layer ranges from 50 to 500 μm, and most preferred thickness ranges from 100 to 400 μm.

In the course of the preparation of the coated solution layer, most of the phosphor particles having a relatively high specific gravity sink to the bottom surface, and therefore the phosphor particles/binder ratio by weight becomes the highest in the vicinity of the bottom surface (i.e., lower surface). A coloring material in the form of particles has a relatively low specific gravity (as compared to the phosphor particles) and is apt to move together with the binder, and hence most of the coloring material goes up to the upper surface. Even in the case that the coloring material is soluble in the binder solution, that is a dye, the dissolved dye moves with the binder up to the upper surface. Thus, the variations of the phosphor particles/binder weight ratio and denseness of the coloring material (that indicates depth of coloring) along the depth direction are formed. Such variations of the components further advance in the course of drying the coated layer by evaporating the solvent. Accordingly, the dried phosphor layer has the maximum phosphor particles/binder weight ratio in the vicinity of its bottom surface, and the coloring material is present in a relatively large amount in the vicinity of the upper surface. The dried phosphor layer is then peeled off the support to give a colored stimulable phosphor sheet.

The stimulable phosphor layer of the radiation image storage panel according to the invention, which has the characteristic arrangement of the components can be prepared, for instance, by combining a stimulable phosphor sheet which is prepared in the same way except for not using the coloring material (that is, uncolored stimulable phosphor sheet, which likewise has the maximum phosphor particles/binder weight ratio in the vicinity of the bottom surface) to the above-obtained colored stimulable phosphor sheet under the condition that the bottom surface of the uncolored phosphor sheet faces the bottom surface of the colored phosphor sheet. If the colored phosphor sheet and the uncolored phosphor sheet have the same thickness, the combined phosphor sheet has the maximum phosphor particles/binder weight ratio in the middle of the phosphor sheet along the depth direction, and the coloring material is present in a relatively large amount in the vicinity of the upper surface.

Alternatively, the colored phosphor sheet and uncolored phosphor sheet can be combined under the condition that the upper surface of the uncolored phosphor sheet is fixed to the bottom surface of the colored phosphor sheet.

Otherwise, two colored phosphor sheets prepared as above are combined under the condition that the bottom surface of one of the phosphor sheets faces the bottom surface of another phosphor sheet to give the radiation image storage panel of the invention.

The radiation image storage panel of the invention also can be prepared using a combination of two colored stimulable phosphor sheets and one uncolored stimulable phosphor sheet by combining the upper surface of one colored sheet to the bottom surface of another colored sheet and then fixing the bottom surface of the uncolored sheet to the bottom surface of the combined colored sheets. The two colored phosphor sheets may have phosphor/binder ratio and concentration of the coloring material which differ from each other.

The combined phosphor sheet is generally provided at least on one surface (that is, a surface downward facing in the procedure of transferring the storage panel), preferably on both surfaces, with a thin transparent plastic film (having a thickness of not more than 30 μm) for the protection of the phosphor layer.

The thin transparent plastic film can be provided on the phosphor layer by evenly coating the surface of the phosphor layer using a doctor blade or the like with a solution prepared by dissolving an organic polymer material such as a cellulose derivative (e.g., cellulose acetate or nitrocellulose) or a synthetic polymer (e.g., polymethyl methacrylate, polyvinyl butyral, polyvinyl formal, polycarbonate, polyvinyl acetate or vinyl chloride-vinyl acetate copolymer) in an appropriate solvent, and drying the coated solution. Otherwise, the thin transparent plastic film can be provided on the phosphor layer by beforehand preparing it from a polymer such as polyethylene terephthalate, polyethylene, polyvinylidene chloride or polyamide, followed by placing and fixing it onto the phosphor layer with an appropriate adhesive agent.

By the above-described process, the radiation image storage panel of the invention can be prepared.

The examples of the present invention and the comparison examples are given below, but the examples are construed by no means to restrict the invention.

EXAMPLE 1

To methyl ethyl ketone were added 200 g of divalent europium activated barium fluorobromide ($BaFBr:Eu^{2+}$) stimulable phosphor particles, 40 g Of a solution of a polyurethane resin (Pandex T-5265M, product of Dai-Nippon Ink Chemical Industries, Co., Ltd.) in methyl ethyl ketone (20 weight %), 2 g of Bisphenol A type epoxy resin, and 16 mg of ultramarine (coloring material). The resulting mixture was stirred by a propeller mixer to give a dispersion containing the binder and the phosphor particles in the ratio of 1:20 (weight ratio) and further containing the coloring material. The obtained dispersion was evenly coated over a polyethylene terephthalate sheet (temporary support having a releasing surface, thickness: 250 μm) fixed on a glass plate with an adhesive, by means of a doctor blade. Thus coated sheet together with the glass plate was placed in an oven and heated gradually from 25° C. to 100° C. to dry the coated layer. Thus, a stimulable phosphor layer having a thickness of 200 μm was formed on the temporary support. The phosphor layer was then separated from the support to give a colored stimulable phosphor sheet A.

The same procedures were repeated except for employing no coloring material to give an uncolored stimulable phosphor sheet B.

The phosphor sheet B was turn over, and the phosphor sheet A was placed on the turn-over phosphor sheet B. The two phosphor sheets were together pressed at 60° C. (temperature higher than the softening temperature of the binder composition) to prepare a combined stimulable phosphor sheet in which the bottom surface of the phosphor sheet A is attached to the bottom surface of the phosphor sheet B.

Figure 2:
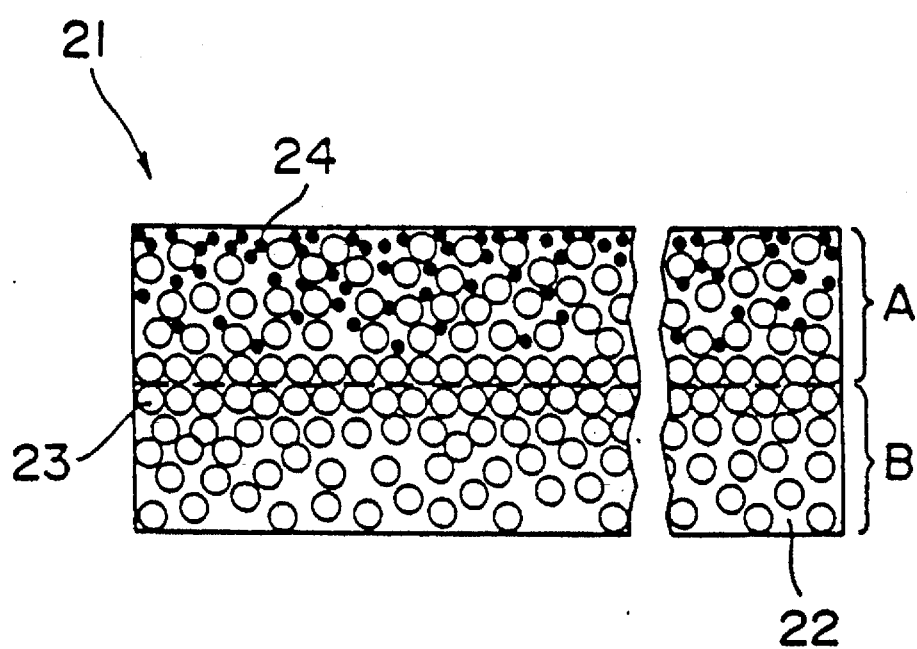
FIG. 2 schematically shows an embodiment of the radiation image storage panel of the invention which is produced in Example 1.

The combined stimulable phosphor sheet was cut to expose its section, which was then observed by an X-rays analyzer and an optical microscope using a red-light source. The above observation indicated that the section of the combined stimulable phosphor sheet had an arrangement schematically illustrated in FIG. 2, that is, the phosphor particles/binder weight ratio was relatively low in the upper surface area as well as in the bottom surface area, and the denseness of the coloring material was relatively high in the upper surface area. In FIG. 2, the numeral 21 stands for the combined stimulable phosphor sheet; A and B stand for the colored phosphor sheet and the uncolored phosphor sheet, respectively; 22 stands for binder; 23 stands for stimulable phosphor particles; and 24 stands for particles of coloring material.

On each surface of the phosphor layer (in the form of an independent sheet) was placed and fixed a transparent polyethylene terephthalate film (thickness: 10 μm) using a polyester type adhesive. Thus, a radiation image storage panel of the invention was obtained.

EXAMPLE 2

A colored phosphor sheet A and an uncolored phosphor sheet B were prepared in the same manner as described in Example 1. In this example, the colored phosphor sheet A was placed and pressed with heating on the uncolored phosphor sheet B which was not turned over, to give a combined stimulable phosphor sheet. Each surface of the combined sheet was covered with a polyethylene terephthalate film in the same manner as described in Example 1, to give a radiation image storage panel of the invention in which the phosphor particles/binder weight ratio was relatively low in the upper surface area, and the denseness of the coloring material was relatively high in the upper surface area.

EXAMPLE 3

Two colored phosphor sheets A were prepared in the same manner as described in Example 1. To the bottom surface of one of the colored phosphor sheet A was combined the bottom surface of another colored phosphor sheet A under pressure and heating. Each surface of the combined phosphor sheet was covered with a polyethylene terephthalate film in the same manner as described in Example 1, to give a radiation image storage panel of the invention in which the phosphor particles/binder weight ratio was relatively low in the upper surface area as well as in the bottom surface area, and the denseness of the coloring material was relatively high in the upper surface area as well as in the bottom surface area, while the denseness of the coloring material was relatively low in the middle area (observed in the depth direction).

COMPARISON EXAMPLE 1

A stimulable phosphor sheet C of 400 μm thick was prepared using the coating dispersion for the preparation of colored stimulable phosphor sheet A described in Example 1. Each surface of the prepared phosphor sheet C was covered with a polyethylene terephthalate film in the same manner as described in Example 1, to give a radiation image storage panel for comparison in which the phosphor particles/ binder weight ratio was the highest in the bottom surface area, and the denseness of the coloring material was the highest in the upper surface area.

COMPARISON EXAMPLE 2

A colored phosphor sheet A and an uncolored phosphor sheet B were prepared in the same manner as described in Example 1. In this example, the colored phosphor sheet A was turned over, and was placed and pressed with heating on the uncolored phosphor sheet B which was not turned over, to give a combined stimulable phosphor sheet. Each surface of the combined sheet was covered with a polyethylene terephthalate film in the same manner as described in Example 1, to give a radiation image storage panel for comparison in which the phosphor particles/binder weight ratio was relatively high in the upper surface area as well as in the bottom surface area, and no coloring material was present in the bottom surface area.

COMPARISON EXAMPLE 3

A colored phosphor sheet A and an uncolored phosphor sheet B were prepared in the same manner as described in Example 1. In this example, the uncolored phosphor sheet B was turned over, and the colored phosphor sheet A which was also turned over was placed and pressed with heating on the turned-over uncolored phosphor sheet B, to give a combined stimulable phosphor sheet. Each surface of the combined sheet was covered with a polyethylene terephthalate film in the same manner as described in Example 1, to give a radiation image storage panel for comparison in which the phosphor particles/binder weight ratio was relatively high in the upper surface area as well as in the middle area, and the denseness of coloring material was relatively low in the upper surface area, while no coloring material was present in the bottom surface area.

COMPARISON EXAMPLE 4

A colored phosphor sheet A and an uncolored phosphor sheet B were prepared in the same manner as described in Example 1. In this example, the colored phosphor sheet A was turned over, and the uncolored phosphor sheet B which was not turned over was placed and pressed with heating on the turned-over colored phosphor sheet A, to give a combined stimulable phosphor sheet. Each surface of the combined sheet was covered with a polyethylene terephthalate film in the same manner as described in Example 1, to give a radiation image storage panel for comparison in which the phosphor particles/binder weight ratio was the highest in the middle area, and the denseness of coloring material was the highest in the bottom surface area.

COMPARISON EXAMPLE 5

A colored phosphor sheet A and an uncolored phosphor sheet B were prepared in the same manner as described in Example 1. In this example, the uncolored phosphor sheet B which was not turned over was placed and pressed with heating on the colored phosphor sheet A which was also not turned over, to give a combined stimulable phosphor sheet. Each surface of the combined sheet was covered with a polyethylene terephthalate film in the same manner as described in Example 1, to give a radiation image storage panel for comparison in which the phosphor particles/binder weight ratio was relatively low in the upper surface area, and the denseness of coloring material was relatively high in the middle area, while was relatively low the bottom surface area, and no coloring material was present in the upper surface area.

COMPARISON EXAMPLE 6

A colored phosphor sheet A and an uncolored phosphor sheet B were prepared in the same manner as described in Example 1. In this example, the uncolored phosphor sheet B which was turned over was placed and pressed with heating on the colored phosphor sheet A which was also turned over, to give a combined stimulable phosphor sheet. Each surface of the combined sheet was covered with a polyethylene terephthalate film in the same manner as described in Example 1, to give a radiation image storage panel for comparison in which the phosphor particles/binder weight ratio was relatively high in the upper surface area, and the denseness of coloring material was the highest in the middle area, while no coloring material was present in the upper surface area.

COMPARISON EXAMPLE 7

A colored phosphor sheet A and an uncolored phosphor sheet B were prepared in the same manner as described in Example 1. In this example, the uncolored phosphor sheet B which was turned over was placed and pressed with heating on the colored phosphor sheet A which was not turned over, to give a combined stimulable phosphor sheet. Each surface of the combined sheet was covered with a polyethylene terephthalate film in the same manner as described in Example 1, to give a radiation image storage panel for comparison in which the phosphor particles/binder weight ratio was relatively high in the upper surface area as well as in the bottom surface area, and the denseness of coloring material was the highest in the middle area, while no coloring material was present in the upper surface area.

COMPARISON EXAMPLE 8

Two uncolored phosphor sheets B were prepared in the same manner as described in Example 1. In this example, one uncolored phosphor sheet B which was not turned over was placed and pressed with heating on another uncolored phosphor sheet B which was turned over, to give a combined stimulable phosphor sheet. Each surface of the combined sheet was covered with a polyethylene terephthalate film in the same manner as described in Example 1, to give a radiation image storage panel for comparison in which the phosphor particles/binder weight ratio was relatively low in the upper surface area as well as in the bottom surface area, and no coloring material was present in the combined sheet.

EVALUATION OF RADIATION IMAGE STORAGE PANEL

Each of the radiation image storage panels of Examples 1 to 3, and Comparison Examples 1 to 8 was placed in the double-side reading apparatus illustrated in FIG. 1 for recording and reproducing a radiation image under the following conditions.

The radiation image storage panel was exposed to X-rays at 80 KVp. The exposed storage panel was then placed in the reading apparatus for transferring it using the two sets of nip rolls, while He-Ne laser (stimulating rays) was applied to the upper surface of the moving storage panel and the emission produced by the stimulable phosphors was collected from the upper and lower sides. The collected emissions were combined and processed to reproduce the radiation image on a silver halide photographic film utilizing a film scanner. The reproduced radiation image were then evaluated according to the criteria given below:

0: Standards for sharpness and graininess which were observed on the radiation image reproduced in the use of the radiation image storage panel of Comparison Example 1.

+2: Prominently better than the standard

+1: Better than the standard

−2: Prominently worse than the standard

−1: Worse than the standard

The results of the observation are given in Table 1.

TABLE 1

|  | Sharpness | Graininess |
| --- | --- | --- |
| Example 1 | +2 | +2 |
| Example 2 | +1 | +1 |
| Example 3 | +2 | +1 |
| Com. Ex. 1 | 0 | 0 |
| Com. Ex. 2 | +2 | −1 |
| Com. Ex. 3 | +2 | −2 |
| Com. Ex. 4 | −2 | +1 |
| Com. Ex. 5 | −2 | −1 |
| Com. Ex. 6 | −1 | +1 |
| Com. Ex. 7 | −1 | −1 |
| Com. Ex. 8 | 0 | +2 |

EXAMPLE 4

To methyl ethyl ketone were added 200 g of divalent europium activated barium fluorobromide (BaFBr:Eu$^{2+}$) stimulable phosphor particles, 40 g of a solution of a polyurethane resin (Pandex T-5265M, product of Dai-Nippon Ink Chemical Industries, Co., Ltd.) in methyl ethyl ketone (20 weight %), 2 g of Bisphenol A type epoxy resin, and 16 mg of ultramarine (coloring material). The resulting mixture was stirred by a propeller mixer to give a dispersion A containing the binder and the phosphor particles in the ratio of 1:20 (weight ratio) and further containing the coloring material.

To methyl ethyl ketone were added 200 g of divalent europium activated barium fluorobromide (BaFBr:Eu$^{2+}$) stimulable phosphor particles, 20 g of a solution of a polyurethane resin (Pandex T-5265M) in methyl ethyl ketone (20 weight %), 1 g of Bisphenol A type epoxy resin, and 2 mg of ultramarine (coloring material). The resulting mixture was stirred by a propeller mixer to give a dispersion A containing the binder and the phosphor particles in the ratio of 1:20 (weight ratio) and further containing the coloring material.

To methyl ethyl ketone were added 200 g of divalent europium activated barium fluorobromide (BaFBr:Eu$^{2+}$) stimulable phosphor particles, 53.3 g of a solution of a polyurethane resin (Pandex T-5265M) in methyl ethyl ketone (20 weight %), and 2.6 g of Bisphenol A type epoxy resin. The resulting mixture was stirred by a propeller mixer to give a dispersion C containing the binder and the phosphor particles in the ratio of 1:20 (weight ratio) and containing no coloring material.

The obtained dispersion C was evenly coated over a polyethylene terephthalate sheet (temporary support having a releasing surface, thickness: 250 μm) fixed on a glass plate with an adhesive, by means of a doctor blade. Just after the coating of the coating dispersion C was complete and not yet dried, the coating dispersion B was uniformly coated on the coated dispersion C. Further, just after the coating of the coating dispersion B was complete and not yet dried, the coating dispersion A was uniformly coated on the coated dispersion B. In the coating procedures, the amounts of the coating solutions used were the same as others. Thus coated sheet together with the glass plate was placed in an oven and heated gradually from 25° C. to 100° C. to dry the coated layer. Thus, a stimulable phosphor layer having a thickness of 400 μm was formed on the temporary support. The phosphor layer was then separated from the support to give a locally colored stimulable phosphor sheet.

The combined stimulable phosphor sheet was cut to expose its section, which was then observed by an X-rays analyzer and an optical microscope using a red-light source. The above observation indicated that the section of the combined stimulable phosphor sheet had the following arrangement of the components: that is, the phosphor particles/binder weight ratio was relatively low in the upper surface area and the highest around ⅔ in the depth direction from the upper surface, and the denseness of the coloring material was the highest in the upper surface area, while no coloring material was present in the bottom surface area.

On each surface of the phosphor layer (in the form of an independent sheet) was placed and fixed a transparent polyethylene terephthalate film (thickness: 10 μm) using a polyester type adhesive. Thus, a radiation image storage panel of the invention was produced.

The produced radiation image storage panel was evaluated in the aforementioned manner, and almost same sharpness and graininess as those of the radiation image storage panel of Example 1 were obtained.

I claim:

1. A radiation image storage panel having a stimulable phosphor layer which comprises a binder and stimulable phosphor particles dispersed therein and is so colored as to absorb a portion of stimulating rays, wherein the coloring and a weight ratio of phosphor particles to binder vary in the phosphor layer in its depth direction under the conditions that a ratio of weight of phosphor particles to binder in a portion up to 1/5 of the depth of the layer from one surface of the layer is lower than the ratio of weight of phosphor particles to binder in the phosphor layer, and the portion is colored more deeply than other portion of the phosphor layer.

2. The radiation image storage panel of claim 1, wherein a ratio of weight of phosphor particles to binder in a portion up to 1/5 of the depth of the layer from another surface of the layer also is lower than the ratio of weight of phosphor particles to binder in the phosphor layer.

3. The radiation image storage panel of claim 2, wherein the portion up to 1/5 of the depth of the layer from another surface of the layer is uncolored.

* * * * *